(12) United States Patent
Le Gonidec et al.

(10) Patent No.: US 10,914,268 B2
(45) Date of Patent: Feb. 9, 2021

(54) METHOD FOR SUPPRESSING THE POGO EFFECT

(71) Applicant: ARIANEGROUP SAS, Paris (FR)

(72) Inventors: Serge Daniel Le Gonidec, Vernon (FR); Jeremy Toutin, Vernon (FR); Alain Kernilis, Freneuse (FR); Olivier Crassous, Guyancourt (FR)

(73) Assignee: ARIANEGROUP SAS, Paris (FR)

( * ) Notice: Subject to any disclaimer, the term of this patent is extended or adjusted under 35 U.S.C. 154(b) by 629 days.

(21) Appl. No.: 15/515,423

(22) PCT Filed: Sep. 21, 2015

(86) PCT No.: PCT/FR2015/052520
§ 371 (c)(1),
(2) Date: Mar. 29, 2017

(87) PCT Pub. No.: WO2016/051047
PCT Pub. Date: Apr. 7, 2016

(65) Prior Publication Data
US 2017/0226965 A1    Aug. 10, 2017

(30) Foreign Application Priority Data

Sep. 30, 2014 (FR) ..................... 14 59254

(51) Int. Cl.
*F02K 9/50* (2006.01)
*F02K 9/56* (2006.01)
(Continued)

(52) U.S. Cl.
CPC .................. *F02K 9/50* (2013.01); *F02K 9/44* (2013.01); *F02K 9/52* (2013.01); *F02K 9/56* (2013.01);
(Continued)

(58) Field of Classification Search
CPC ..... F02K 9/44; F02K 9/50; F02K 9/56; F02K 9/566; F02K 9/60
See application file for complete search history.

(56) References Cited

U.S. PATENT DOCUMENTS

| 4,039,000 A | 8/1977 | Fletcher et al. |
|---|---|---|
| 7,752,833 B2 | 7/2010 | Feiz |

(Continued)

FOREIGN PATENT DOCUMENTS

| CN | 101000017 A | 7/2007 |
|---|---|---|
| FR | 2161794 | 7/1973 |

(Continued)

OTHER PUBLICATIONS

Ex parte Schulhauser, Appeal 2013-007847, Patent Trial and Appeal Board, Apr. 28, 2016, pp. 1-22. (Year: 2016).*

(Continued)

*Primary Examiner* — Lorne E Meade
(74) *Attorney, Agent, or Firm* — Oblon, McClelland, Maier & Neustadt, L.L.P.

(57) ABSTRACT

A field of vehicles propelled by reaction, and more specifically to a method of suppressing the pogo effect in such a vehicle. A feed system for feeding a reaction engine of the vehicle includes a hydraulic accumulator enabling a selection to be made from among a plurality of predetermined operating levels, each corresponding to a different volume of gas. In the method, if a first reference criterion is not satisfied by the current level, the hydraulic accumulator is ordered to make a transition, preferably to an alternative level selected from among alternative levels for which the first reference criterion is satisfied and for which no hydraulic resonant frequency crosses any current mechanical resonant frequency during the transition.

7 Claims, 7 Drawing Sheets

(51) Int. Cl.
*F02K 9/44* (2006.01)
*F02K 9/52* (2006.01)
*F02K 9/60* (2006.01)

(52) U.S. Cl.
CPC ............... *F02K 9/566* (2013.01); *F02K 9/60* (2013.01); *F05D 2260/96* (2013.01)

(56) References Cited

U.S. PATENT DOCUMENTS

| | | | |
|---|---|---|---|
| 9,528,470 B2* | 12/2016 | Kernilis | F02K 9/566 |
| 2007/0157619 A1 | 7/2007 | Feiz | |
| 2013/0312706 A1 | 11/2013 | Salvador et al. | |
| 2014/0174054 A1 | 6/2014 | Kernilis et al. | |
| 2017/0058836 A1* | 3/2017 | Kernilis | F02K 9/566 |

FOREIGN PATENT DOCUMENTS

| | | |
|---|---|---|
| FR | 2499641 A1 | 8/1982 |
| JP | 3-287498 A | 12/1991 |
| WO | 2012/156615 A2 | 11/2012 |

OTHER PUBLICATIONS

Mechanical-Resonance Webpage (https://en.wikipedia.org/wiki/Mechanical_resonance accessed on Sep. 30, 2019). (Year: 2019).*

International Search Report dated Dec. 23, 2015, in PCT/FR2015/052520, filed Sep. 21, 2015.

Notice on the First Office Action (PCT Application in the National Phase) dated May 9, 2018 in corresponding Chinese Patent Application No. 201580052756.3 (with English translation)(10 pages).

Notice on the Second Office Action dated Dec. 3, 2018 in corresponding Chinese Patent Application No. 201580052756.3 (with English translation)(10 pages).

* cited by examiner

METHOD FOR SUPPRESSING THE POGO EFFECT

BACKGROUND OF THE INVENTION

The present invention relates to a method of suppressing the pogo effect on board a vehicle propelled by at least one reaction engine fed with at least one liquid propellant. The term "reaction engine" is used in this context to cover in particular rocket engines, and the term "vehicle" to cover any piloted or non-piloted vehicle, and in particular space launchers.

In the aerospace field, and more particularly in the field of liquid propellant rockets, the "pogo" effect designates a liquid propellant in the feed circuit of a reaction engine entering into resonance with mechanical oscillations of the vehicle being propelled by the reaction engine. Since the thrust from the engine can vary with the rate at which propellant is delivered by the feed circuit, such entry into resonance can lead to rapidly diverging oscillations and can thus give rise to difficulties of guidance, and indeed to damage that may go as far as total loss of the payload or indeed of the vehicle. The term "pogo effect" does not come from an acronym, but rather from pogo sticks, i.e. toys formed by a rod with a spring that bounces in a manner that reminds technicians of the violent longitudinal oscillations caused in rockets by this effect. Since the beginning of developing liquid propellant rockets, it has therefore been found most important to take measures for suppressing the pogo effect. In the context of the present description, the term "suppressing" should be understood as covering both total suppression totally and partial reduction.

Two main different types of system for correcting the pogo effect are known to the person skilled in the art: passive systems and active systems. With passive systems, the hydraulic resonant frequencies are changed so that they cannot coincide with the mechanical resonant frequencies of the rocket. They can also be damped. By way of example, this can be done by installing hydraulic accumulators in the propellant feed circuit. Such a hydraulic accumulator is formed in particular by a pressurized volume containing gas and liquid in communication with the feed circuit. The hydraulic accumulator then acts as a mass-spring-damper system in which the mass is the mass of liquid in the accumulator. The spring is formed by the gas, and damping comes from the viscosity of the liquid entering and leaving the accumulator via a restricted duct. In an equivalent electrical circuit, such a hydraulic accumulator corresponds to a capacitor of constant capacitance. The compressibility and damping parameters of such an accumulator are substantially constant, or at least are not controllable. In contrast, with active systems, an opposing pressure-flowrate oscillation is created in the feed circuit to oppose the oscillations measured in that circuit.

Nevertheless, both passive systems and active systems present drawbacks. Passive systems are not suitable for rockets that present a large degree of variability in their mechanical resonant frequencies, since they do not damp modes outside a narrow band around the frequencies for which they are designed. If there is a difference between the predicted dynamic behavior and the real dynamic behavior of the flight of the rocket, they cannot correct themselves. As for active systems, they run the risk of having effects that are positive only locally, and elsewhere they can give rise to effects that are negative, whether locally or globally.

In order to avoid those drawbacks, international patent application WO 2012/156615 discloses various devices and methods for suppressing the pogo effect, whereby it is possible to vary the hydraulic resonant frequencies in the feed system in order to keep them at a distance from the mechanical resonant frequencies throughout the entire flight of the vehicle. In particular, that prior document discloses using a hydraulic accumulator in a system for feeding a reaction engine with at least one propellant, which accumulator makes it possible to select between a plurality of predetermined operating levels, each corresponding to a different volume of gas in the hydraulic accumulator. In an analogous electrical circuit, such an electrical accumulator would correspond to a capacitor of capacitance that is variable from among a plurality of determined levels. Nevertheless, in the method disclosed in that document, under certain circumstances, when going from a first level that is not far enough away from the mechanical resonant frequency to a second level that is far enough from the mechanical resonant frequency, but situated on the opposite side of the curve plotting the mechanical resonant frequency, at least one hydraulic resonant frequency can briefly cross a mechanical resonant frequency. Although such a transient and rapid coincidence between the resonant frequencies cannot normally lead to resonance, it should nevertheless be avoided.

OBJECT AND SUMMARY OF THE INVENTION

The present invention seeks to remedy those drawbacks. The invention seeks to propose a method that makes it possible to suppress the pogo effect in more effective manner, while avoiding to a great extent any crossing of hydraulic and mechanical resonant frequencies, even if only transient.

In an implementation, this object is achieved by the fact that after the following steps:
- calculating a current hydraulic resonant frequency for each mode of a set of hydraulic resonance modes of said feed system with a current level of said accumulator from among said predetermined levels;
- calculating an alternative hydraulic resonant frequency for each mode of said set of hydraulic resonance modes of said feed system with each level of the predetermined levels that is an alternative to the current level; and
- calculating a current difference between each current hydraulic resonant frequency and a current mechanical resonant frequency for each mode of a set of mechanical resonance modes of a structure of said vehicle;

if a first reference criterion is not satisfied by all of the current differences, a set of differences between each alternative hydraulic resonant frequency and each current mechanical resonant frequency is calculated for each alternative level, and if said first reference criterion is satisfied by each set of differences of a plurality of alternative levels, the hydraulic accumulator is ordered to make a transition from the current level to an alternative level selected from among said alternative levels for which the first reference criterion is satisfied, and for which no hydraulic resonant frequency crosses any current mechanical resonant frequency during the transition.

In the present context, the term "set" is to be understood broadly, covering not only a plurality, but also a set with a single element.

By means of these provisions, if the hydraulic accumulator offers at least one alternative level satisfying the first reference criterion and capable of being reached without any frequencies crossing, that is the level that will be selected, thereby avoiding any crossing that presents some risk, even if small, of entering into resonance.

In certain circumstances, it may also be found that the first reference criterion is satisfied by each set of differences of a plurality of alternative levels that can be reached without any frequency crossing. Under such circumstances, said transition may be ordered to an alternative level selected from among those for which the first reference criterion is satisfied and for which the transition does not involve any frequencies crossing, for which a comparative parameter, calculated as a function of the corresponding set of differences, presents a maximum value, thus making it possible to perform additional optimization in the choice of alternative levels to which the transition is to take place. By way of example, this comparative parameter may be the minimum difference in said set of differences, the sum of said set of differences, or indeed the modulus of a vector having its components made up of said set of differences.

Even with this first comparative parameter, it can be found that the first reference criterion is satisfied by each set of differences of a plurality of alternative levels that can be reached without any frequencies crossing and for which the comparative parameter presents the same maximum value. Under such circumstances, it is still possible to distinguish between these alternative levels by also using a predetermined preference order and thus ordering the transition to an alternative level having a maximum rank in a predetermined order, from among those for which the first reference criterion is satisfied for which the transition does not involve any frequencies crossing, and presenting the same maximum value for the comparative parameter.

Alternatively, it may also be found that the first reference criterion is not satisfied by the set of current differences, but is satisfied by the set of differences for only one alternative level. Under such circumstances, it is possible to order the hydraulic accumulator to make a transition to the sole alternative level that completely satisfies the first reference criterion.

Said first reference criterion may be that each of the differences of each set of differences is greater than a predetermined threshold. It may also be found that said first reference criterion is not satisfied for any level, whether current or alternative, but that a second reference criterion that is less constricting is satisfied for a set of alternative levels. Under such circumstances, it is possible to order the hydraulic accumulator to make a transition to an alternative level selected from the set of alternative levels for which the second reference criterion is satisfied, and for which a comparative parameter calculated as a function of the corresponding set of differences presents a maximum value. As in the above-mentioned circumstance, this comparative parameter may for example be the minimum difference in said set of differences, the sum of said set of differences, or indeed the modulus of a vector made up of components made up of said set of differences.

Said second reference criterion may be that each of the differences of said set of differences is greater than a predetermined threshold, which could be a fraction of the threshold corresponding to the first criterion. Finally, it may also be found that neither of said first and second reference criteria is satisfied by any of the levels, whether current or alternative. Under such circumstances, alternating transitions may be ordered between at least two current and alternative levels so as to avoid proximity for too great a length of time between the same hydraulic resonant frequency and mechanical resonant frequency pairs, where such proximity could lead to resonance phenomena.

If said first reference criterion is satisfied for each set of differences of a plurality of alternative levels, it is possible to determine that no hydraulic resonant frequency will cross any current mechanical resonant frequency during the transition of the hydraulic accumulator from the current level to an alternative level selected from among said alternative levels for which the first reference criterion is satisfied, firstly by determining, for each mode of said set of hydraulic resonance modes, a minimum hydraulic resonant frequency and a maximum hydraulic resonant frequency from the hydraulic resonant frequency for the current capacitance and from the hydraulic resonant frequency for the selected alternative level, and then by comparing, for each mode of said set of hydraulic resonance modes, the minimum hydraulic resonant frequency and the maximum hydraulic resonant frequency with the current mechanical resonant frequency for each mechanical resonance mode of said set of mechanical resonance modes, it not being possible for any hydraulic resonant frequency to cross any current mechanical resonant frequency during the transition to the selected alternative level if, for none of said hydraulic and mechanical resonance modes, the minimum hydraulic resonant frequency is less than the mechanical resonant frequency and the maximum hydraulic resonant frequency is greater than the mechanical resonant frequency.

The present disclosure also relates to a vehicle comprising at least a reaction engine, and a feed system for feeding said engine with at least one liquid propellant, said feed system being provided with a hydraulic accumulator enabling a selection to be made between a plurality of predetermined operating levels each corresponding to a different volume of gas in the hydraulic accumulator, and a control unit configured to perform the above-mentioned method of suppressing the pogo effect. Furthermore, the control unit may be a programmable control unit, and this disclosure thus also relates to a computer program for performing this method for suppressing the pogo effect, and to a data storage medium including such a program in a manner that is readable by an electronic unit for processing data, and an electronic data processor unit programmed to perform the method. The term "data storage medium" is used to cover any form of random access or read only memory (RAM or ROM) that is capable of containing data in a computer readable form, including optical media, magnetic media, and/or electronic media.

BRIEF DESCRIPTION OF THE DRAWINGS

The invention can be well understood and its advantages appear better on reading the following detailed description of an embodiment given by way of non-limiting example. The description refers to the accompanying drawings, in which.

DETAILED DESCRIPTION OF THE INVENTION

Figure 1:
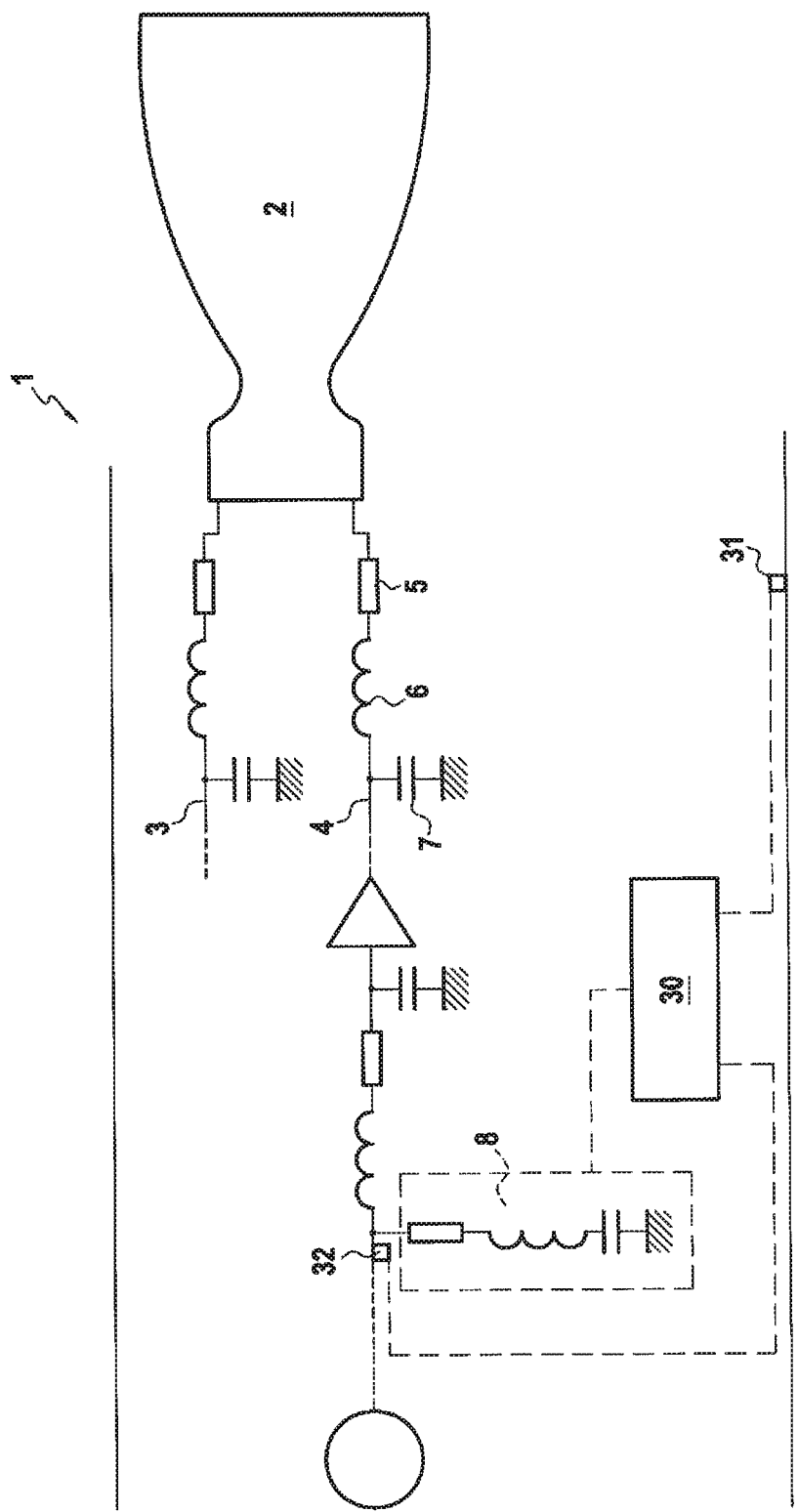
FIG. 1 is a diagram based on an analogy between hydraulic and electrical circuits, showing a rocket engine vehicle with a liquid propellant feed system in an embodiment of the invention.

The vehicle 1 shown in FIG. 1 has a reaction engine 2 with a combustion chamber and a convergent-divergent nozzle. The vehicle 1 also has a feed system 3, 4 for each of two liquid propellants that react together chemically and that are fed to the reaction engine 2. The first feed system 3 is shown in part only. When filled with fluid, each of the feed systems 3 and 4 represents a dynamic system that can be modeled as an electrical circuit made up of resistors 5, inductors 6, and capacitors 7, and that normally presents a plurality of hydraulic resonance modes, each at the respective hydraulic resonant frequency fh.

Figure 2A:
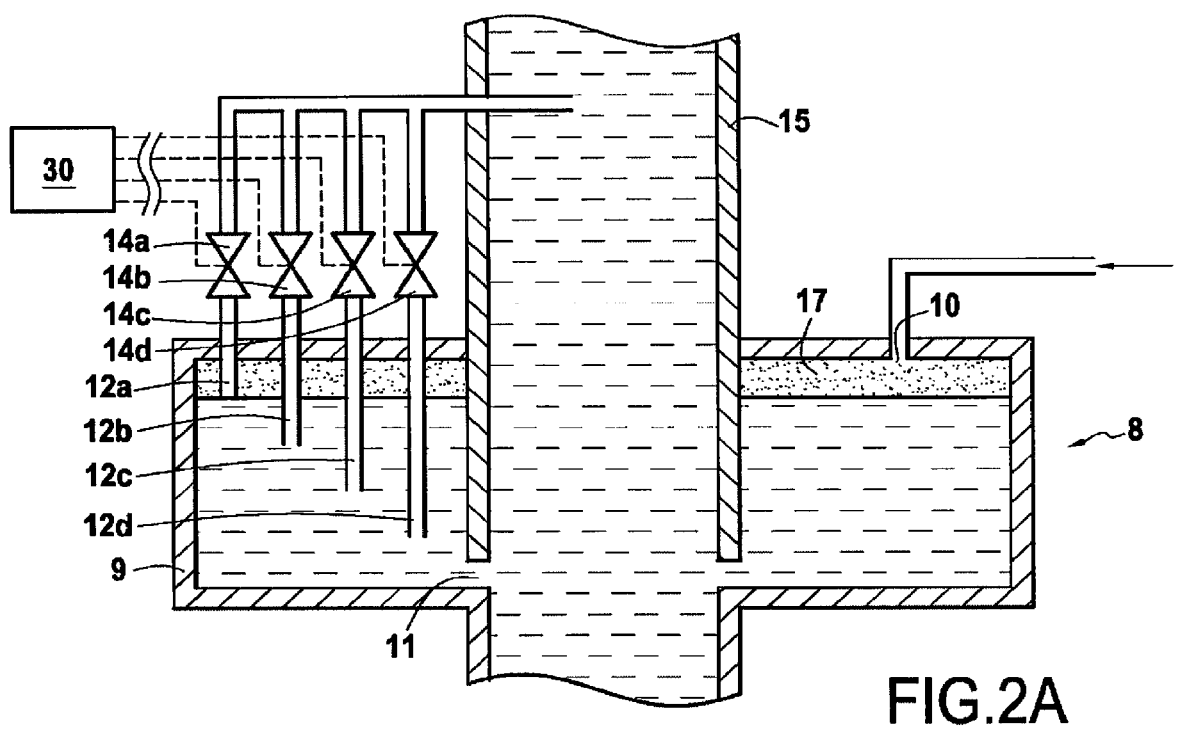
FIGS. 2A and 2B are cross-sections of a hydraulic accumulator of variable gas volume installed in parallel with a feed circuit of the FIG. 1 system.
Figure 2B:
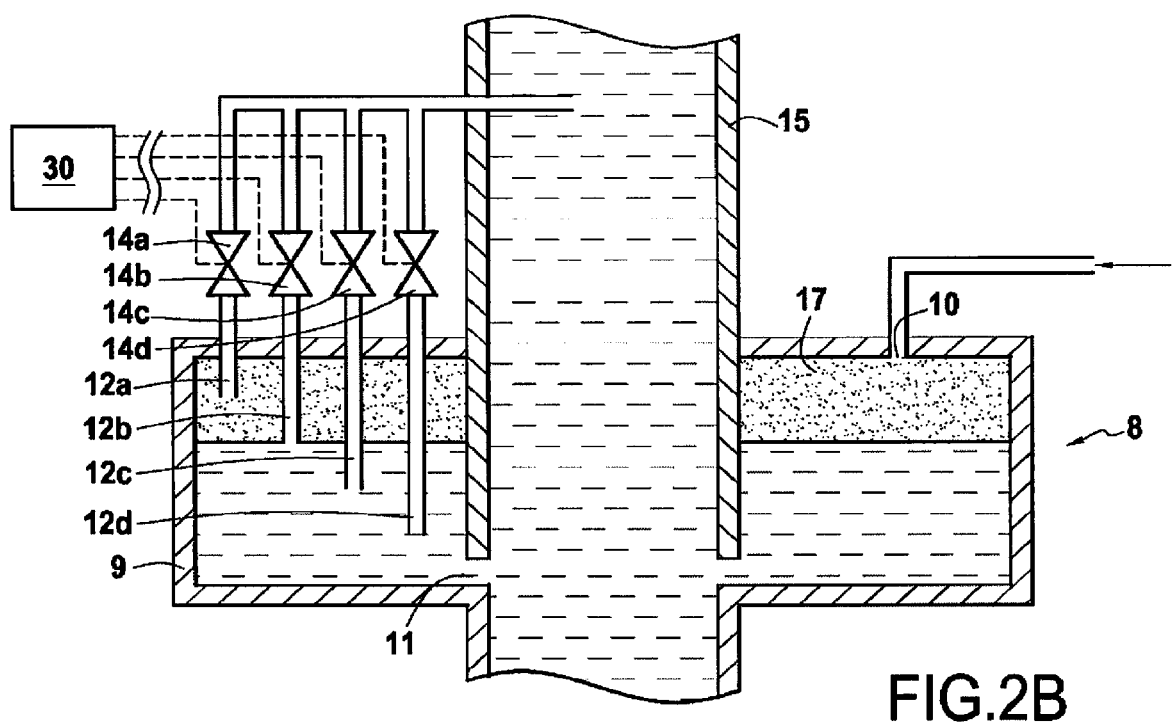

In order to vary at least one resonant frequency of the second feed circuit 4, this circuit includes, in parallel therewith, a hydraulic accumulator 8 having a volume of gas that is variable, and thus having compressibility that is also variable. This accumulator 8, shown in FIGS. 2a and 2b comprises a tank 9 with, on one side, a point 10 for feeding it with gas under pressure, and on an opposite side, a connection 11 to a duct 15 of the second feed circuit 4. At different levels between the point 10 and the connection 11, dip tubes 12a to 12d connect the tank 9 with the duct 15. Each dip tube 12a to 12d includes a valve 14a to 14d that is interposed between the tank 9 and the duct 15. All of the valves 14a to 14d are connected to a control unit 30 in order to cause them to open and close. Opening and closing the valves 14a to 14d serves to vary the level of liquid, and thus the volume of gas 17, in the tank 9, as shown in FIGS. 2a and 2b. In FIG. 2a, the valve 14a of the shortest dip tube 12a is open, while the valves 14b to 14d of the other dip tubes 12b to 12d are closed. The free surface of the liquid is thus stabilized at the level of the inlet of the dip tube 12a, and the volume of gas 17 and thus the compressibility thereof remain relatively limited. In contrast, in FIG. 2b, the valve 14a of the dip tube 12a is closed, and it is the valve 14b of the following dip tube 12b that is open. The free surface of the liquid is thus stabilized at the lower level of the inlet of the dip tube 12b, and the volume of gas 17, and thus the compressibility, increase accordingly. It is possible to further increase the "capacitance" of the hydraulic accumulator 8 by consecutive levels by opening the other valves 14c and 14d.

The structure of the vehicle 1 may vibrate, in particular in a plurality of mechanical resonance modes, each associated with a mechanical resonant frequency fm. In flight, these mechanical resonant frequencies vary over time, in particular because of the progressive emptying of the propellant tanks used for feeding the combustion chamber 2. Even if the hydraulic resonant frequencies fh and the mechanical resonant frequencies fm are initially quite far apart from one another in order to avoid the pogo effect, under certain circumstances the variation in the mechanical resonant frequencies fm can bring them close to the hydraulic resonant frequencies fh so as to trigger this pogo effect, assuming that the hydraulic resonant frequencies remain unchanged.

Figure 3A:
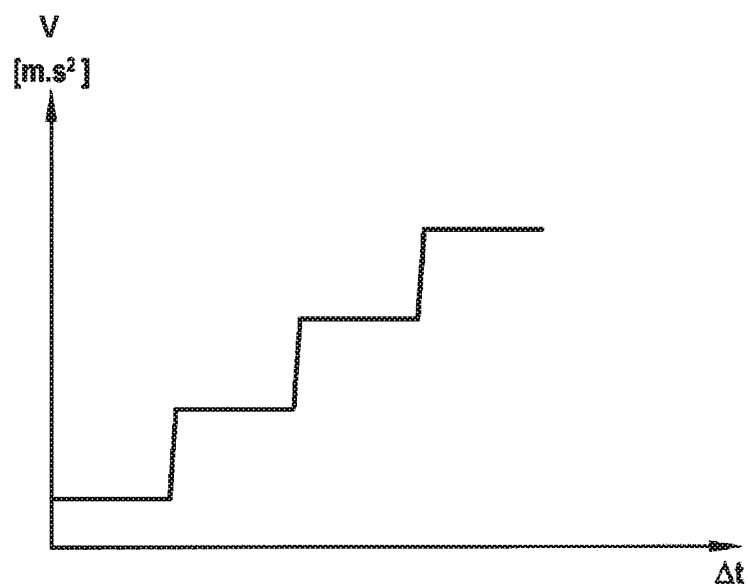
FIGS. 3A and 3B are graphs showing how the volume of gas and the hydraulic resonant frequencies vary in the FIG. 1 feed system as the FIG. 2 hydraulic accumulator passes through a plurality of levels.
Figure 3B:
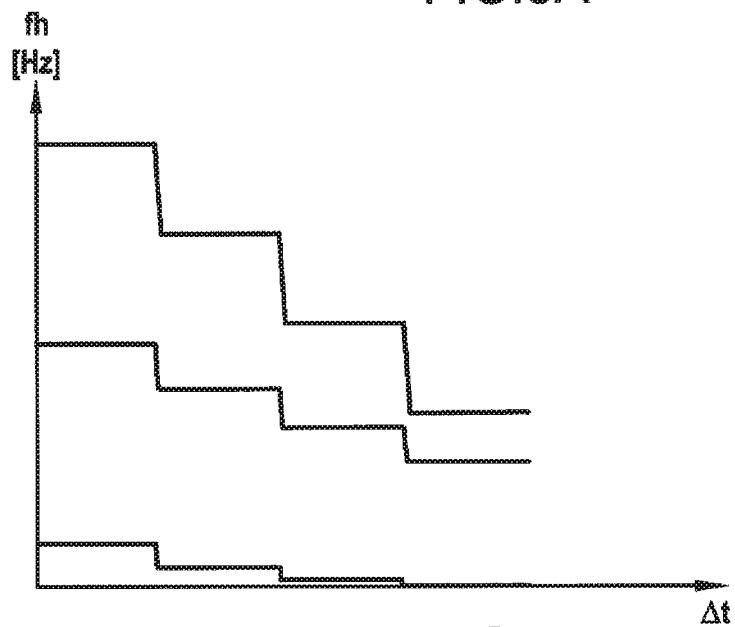

Since the four dip tubes 14a to 14d make it possible to select one operating level from a set of four predetermined levels each corresponding to a different volume of gas in the accumulator 8, and since they make it possible to pass from any one of the levels in this set to another, it thus becomes possible, even while the rocket engine of the vehicle 1 is in operation, to adapt the hydraulic resonant frequencies fh of the various hydraulic resonance modes of the second feed circuit 4 so as to avoid any one of them coinciding with a time-varying mechanical resonant frequency fm of a mechanical resonance mode of the structure of the vehicle 1. FIG. 3A shows how the gas volume V in the accumulator 8 varies on passing through a plurality of successive levels for the level of the free surface of the liquid in the accumulator 8. FIG. 3B shows how the hydraulic resonant frequencies fh (in hertz) vary corresponding to the first three hydraulic resonance modes of the second feed circuit 4. It can be seen how each of the hydraulic resonant frequencies fh decreases likewise in levels at the same time as the "capacitance" of the accumulator 8 increases in levels.

Figure 4:
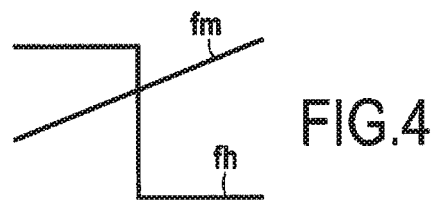
FIG. 4 is a plot showing a hydraulic resonant frequency crossing a mechanical resonant frequency during the transition from one of said levels to another.

In certain circumstances, when the hydraulic accumulator 8 makes the transition from a current level to an alternative level from among the set of predetermined levels, this transition being for the purpose of increasing the distance between the hydraulic resonant frequencies fh and the mechanical resonant frequencies fm, at least one of the hydraulic resonant frequencies fh can momentarily cross at least one of the mechanical resonant frequencies fm, as shown by the crossed lines in FIG. 4. Although such coincidence between hydraulic and mechanical resonant frequencies is only transient, which limits any risk of the pogo effect being triggered, it is generally appropriate to avoid any such crossings.

Figure 5:
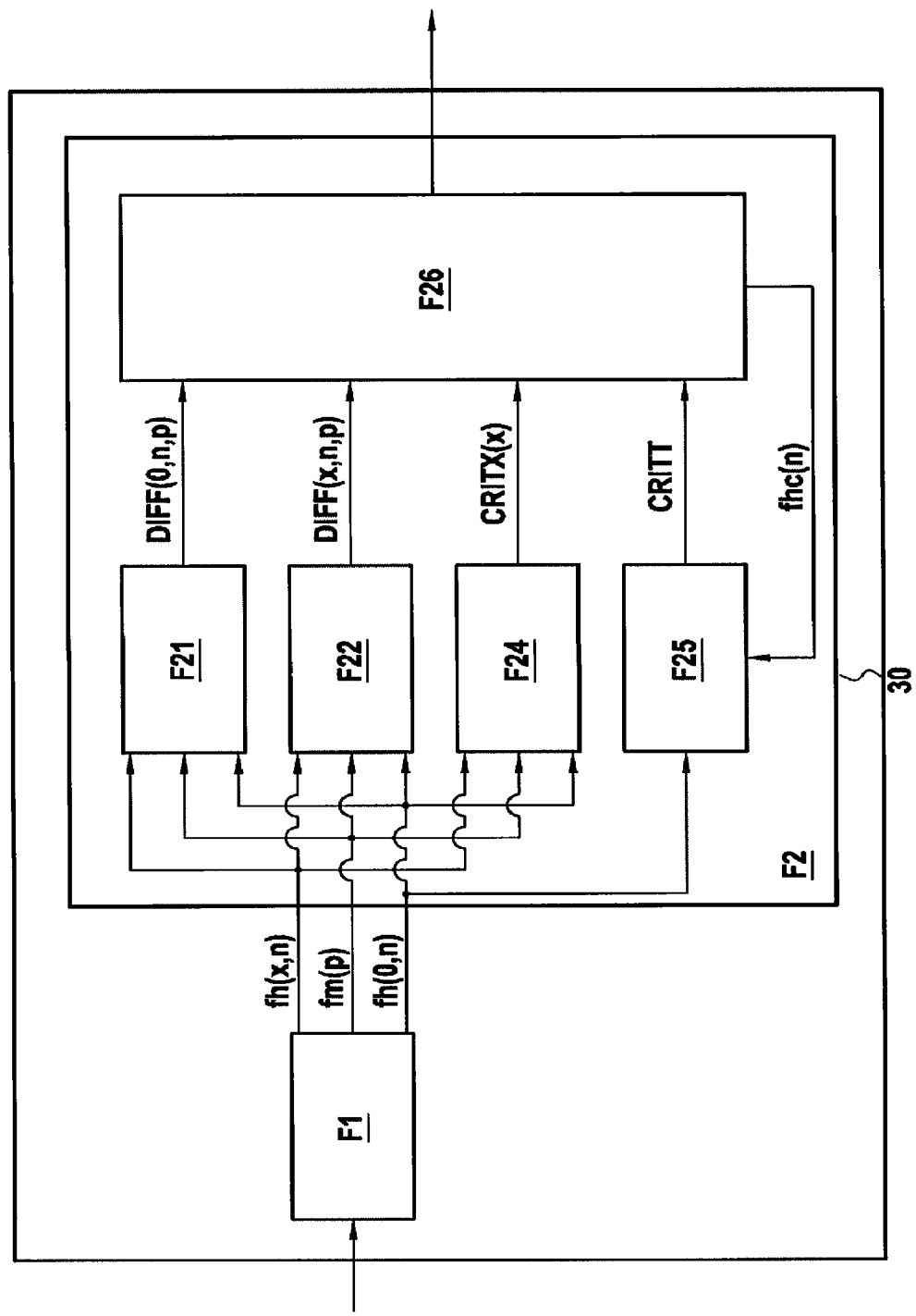
FIG. 5 is a functional diagram of a control unit of the hydraulic accumulator.

The control unit 30 may in particular have a data processor unit configured and/or programmed to perform the method of suppressing the pogo effect. In particular, the control unit 30 may have a RAM or a ROM storing a series of instructions, i.e. a program, for performing the method. FIG. 5 is a functional diagram of the control unit 30, showing it as a set of interconnected functional modules.

Thus, this control unit 30 comprises a first calculation module F1 for performing the following calculations on the basis of physical parameters as supplied by sensors 31 and/or as estimated by at least one model of the vehicle 1, and for each resonance mode of a set of hydraulic and mechanical resonance modes:

- the hydraulic resonant frequency fh(0,n) of the feed system 4 corresponding to the current level, i.e. with the present volume of gas in the accumulator 8, for each resonance mode n from a set of N hydraulic resonance modes;
- the current mechanical resonant frequency fm(p) of the structure of the vehicle 1 for each resonance mode p of a set of P mechanical resonance modes; and
- the hydraulic resonant frequency fh(x,n) of the feed system 4 corresponding to each level x of the other available levels, i.e. for each of the alternative levels in the accumulator 8 from among the set of predetermined levels, for the same resonance mode n from among the set of N hydraulic resonance modes.

Optionally, the first calculation module F1 may also calculate uncertainty ranges for each of these frequencies.

The control unit 30 also has a decision module F2 for ordering a change of level on the basis of values calculated by the first calculation module F1. As shown in FIG. 5, this decision module F2 may be made up in turn of a plurality of other functional modules, including a second calculation module F21 for calculating the differences DIFF(0,n,p) between each current hydraulic resonant frequency fh(0,n) and each current mechanical resonant frequency fm(p), a third calculation module F22 for calculating the differences DIFF(x,n,p) between each alternative hydraulic resonant frequency fh(x,n) and each current mechanical resonant frequency fm(p), a module F24 for detecting frequency crossings, a module F25 for detecting a change of current level, and a module F26 for selecting a level. In order to calculate the current and alternative differences DIFF(0,n,p) and DIFF(x,n,p) for each hydraulic resonance mode n and for each mechanical resonance mode p, the second and third calculation modules F21 and F22 may take account of the uncertainty ranges possibly supplied by the first calculation module F1.

Figure 6:
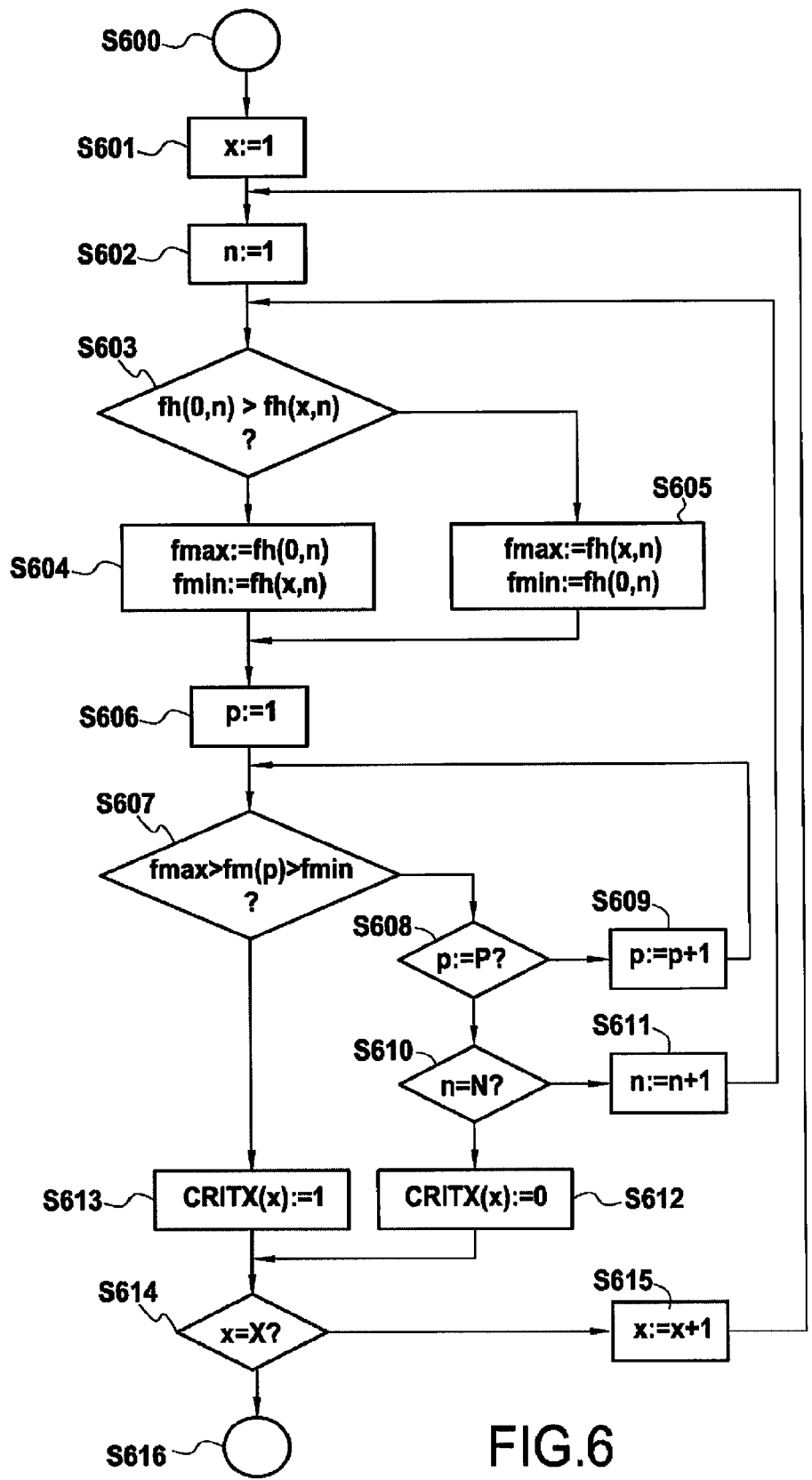
FIG. 6 is a flowchart showing an algorithm for detecting frequencies crossing.

The frequency crossing detection module F24 is designed to determine which transitions from among all of the potential transitions from the current level to various alternative levels of the hydraulic accumulator 8 avoid any of the hydraulic frequencies fh crossing any of the mechanical frequencies fm. For this purpose, in this frequency crossing detection module F24, the following algorithm as illustrated by the flowchart of FIG. 6 is performed:

After this algorithm is started S600, counters x and n are initialized, each with a value 1, in corresponding steps S601 and S602.

In a step S603, the current hydraulic resonant frequency fh(0,n) is compared with the alternative hydraulic resonant frequency fh(x,n) for the same hydraulic resonance mode n. If the current hydraulic resonant frequency fh(0,n) is greater than the alternative hydraulic resonant frequency fh(x,n), then in a step S604, the current hydraulic resonant frequency fh(0,n) is stored as being a high frequency fhmax and the alternative hydraulic resonant frequency fh(x,n) is stored as being a low frequency fhmin. However, if the current hydraulic resonant frequency fh(0,n) is not greater than the alternative hydraulic resonant frequency fh(x,n), then, in a step S605, the current hydraulic resonant frequency fh(0,n) is stored as being a low frequency fhmin and the alternative hydraulic resonant frequency fh(x,n) is stored as being a high frequency fhmax.

Once the low and high frequencies fhmin and fhmax have been stored in this way, the counter p is initialized with the value 1 in a step S606. Thereafter, in a step S607, the current mechanical resonant frequency fm(p) is compared with said low and high frequencies fhmin and fhmax in order to determine whether the current mechanical resonant frequency fm(p) is less than the high frequency fhmax and greater than the low frequency fhmin. If not, in a step S608, the value of the counter p is compared with its maximum value P, i.e. with the number P of mechanical resonance modes that need to be taken into account by the algorithm. If this value P is not reached, then one unit is added to the counter p in a step S609 and the method loops back to the step S607 in order to compare the mechanical resonant frequency for the following mechanical resonance mode with the low and high frequencies fhmin and fhmax. Otherwise, if the maximum value P of the counter p is reached, then in a step S610, the counter n is compared with its maximum value N, i.e. with the number N of hydraulic resonance modes that are to be taken into account by the algorithm. If this value N is not reached, then, in a step S611, one unit is added to the counter n and the method loops back to the step S603 in order to determine the low and high frequencies for the following hydraulic resonance modes and then compare them with the mechanical resonant frequencies. Otherwise, if the maximum value N of the counter n is indeed reached without the comparison of step S607 giving a positive result for any of the N hydraulic resonance modes and any of the P mechanical resonance modes, then a value zero is stored for a binary signal CRITX(x) in a step S612, thus indicating that the alternative level x can be reached from the current level without any frequencies crossing.

Furthermore, if in the step S607 the comparison between the current mechanical resonant frequency fm(p) and said low and high frequencies fhmin and fhmax gives a positive result, then, in a step S613, a value 1 is stored directly for the binary signal CRITX(x), without continuing with the loops corresponding to the counters n and p.

After either the step S612 or the step S613, the value of the counter x is compared with its maximum value X in a step S614. This determines whether each of the X alternative levels has been verified. If not, one unit is added to the value of the counter X in a step S615, and the method returns to the step S602 of initializing the counter x. Otherwise, if the maximum value X has indeed been reached for the counter x, then the algorithm for detecting frequency crossings is stopped at its end S616.

The module F25 for detecting a change of the current level is configured to detect whether a transition between levels is currently taking place and it generates a binary signal CRITT with a value zero if no transition is indeed taking place and a value 1 if such a transition is indeed taking place. For this purpose, the module F25 may for example rely, as shown, on a comparison between the values of the current hydraulic resonant frequencies fh(0,n) as calculated by the module F1 and the hydraulic resonant frequencies fhc(n) corresponding to the level currently selected by the level selection module F26 for the same hydraulic resonance mode n. The value of the signal CRITT then goes from zero to one when the differences between the values of the current hydraulic resonant frequencies fh(0,n) and the values of the hydraulic resonant frequencies fhc(n) corresponding to the currently selected level for the same hydraulic resonance modes n exceed an uncertainty threshold, and return to zero as soon as these differences pass back under the uncertainty threshold, or that a time threshold since the beginning of the transition has been exceeded. Nevertheless, alternatively, such a transient state of level change may be determined in other ways, such as for example on the basis of time gradients in the current hydraulic resonant frequencies fh(0, n), by observing the valves 14a to 14d or their control signals, or indeed by observing the level of liquid in the accumulator 8.

Figure 7:
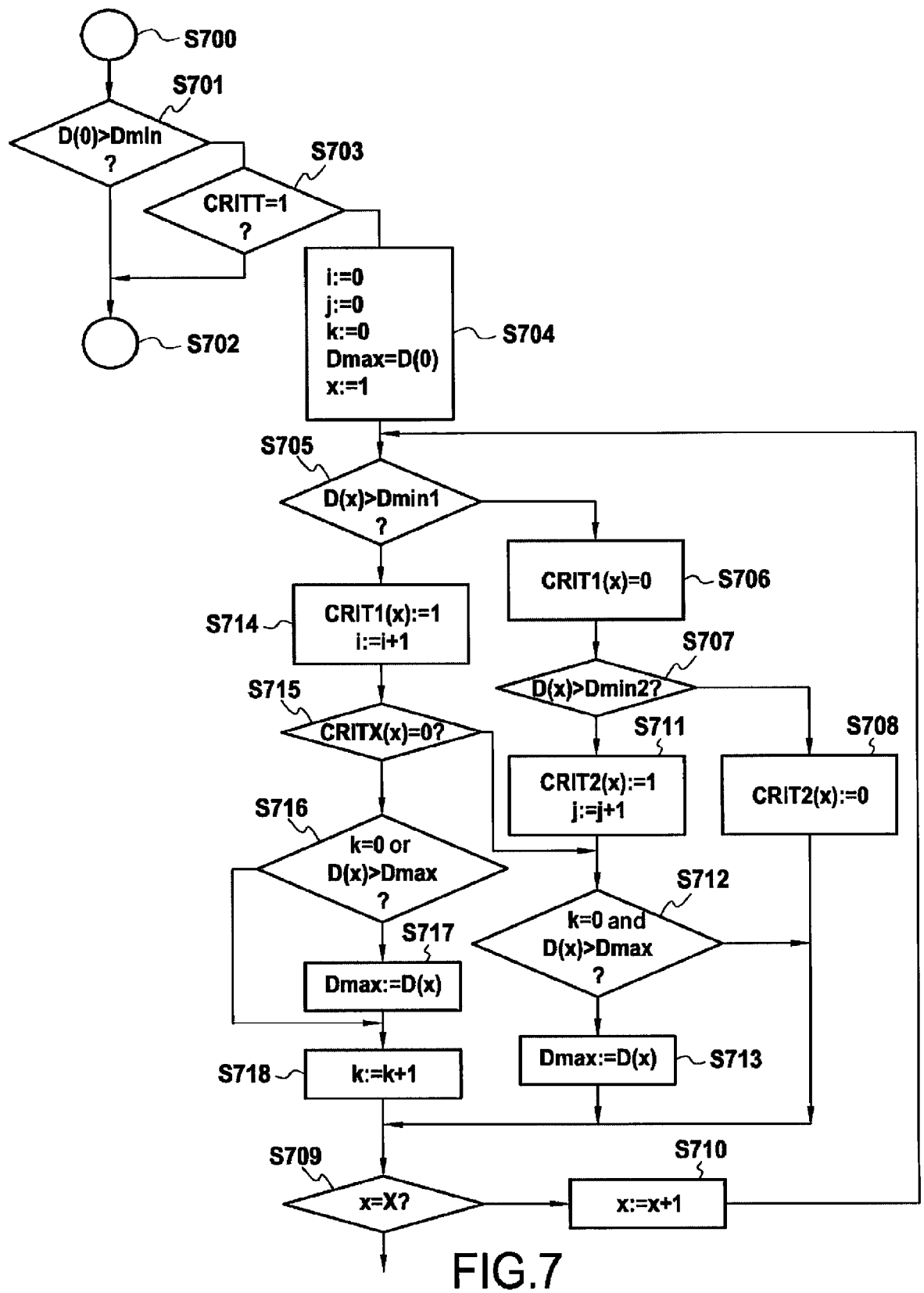
FIGS. 7 and 8 are flowcharts showing respectively a first portion and a second portion of an algorithm governing a method of suppressing the pogo effect.
Figure 8:
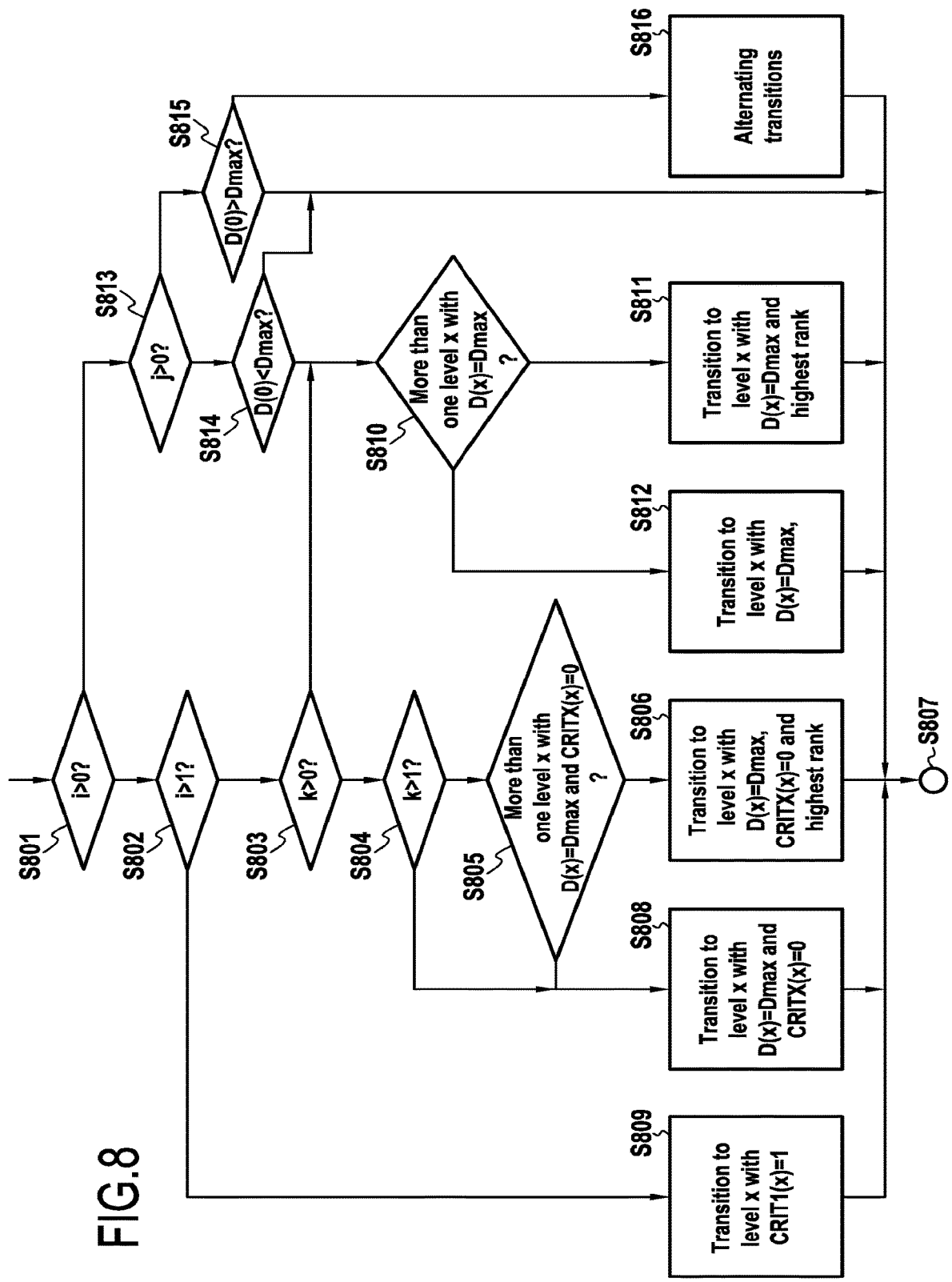

The level selector module F26 is configured to select an operating level from among the X alternative levels and to cause the hydraulic accumulator 8 to make the transition to this alternative level using the algorithm shown in FIGS. 7 and 8, on the basis of the signal CRITT transmitted by the module F25 for detecting a change of level, of the signals CRITX(x) transmitted by the module F24 for detecting frequencies crossing, and of the current and alternative differences DIFF(0,n,p) and DIFF(x,n,p) as calculated by the second and third calculation modules F21 and F22. Once this algorithm has started, S700, it is verified initially in a step S701 whether a first reference criterion is not already satisfied by the current level. In the implementation shown, this first reference criterion is that the distance D(0) between the set of current hydraulic resonant frequencies fh(0,n) and the set of mechanical resonant frequencies fm(p) is greater than a first threshold Dmin1. By way of example, this distance D(0) may be calculated as being the smallest of the differences DIFF(0,n,p). If the current level satisfies this first reference criterion, no level transition is needed and the algorithm is interrupted immediately by passing to a finalization step S702. However, if the current level does not satisfy this first reference criterion, then in a step S703, it is verified that the value of the signal CRITT, indicating an ongoing level transition, is not equal to 1. If the signal CRITT does indeed indicate that there is an ongoing transition, then the algorithm is also interrupted, by passing to the finalization S702. In contrast, if the value of the binary signal CRITT is zero, then the method passes to an initialization step S704 in which counters i, j, and k are initialized with the value zero, the value of a parameter DMAX is initialized with the value of the distance D(0), and the counter x is initialized with a value of 1. Thereafter, in a step S705, it is verified whether the first reference criterion is satisfied by the alternative level x, i.e. whether the distance D(x), calculated in the same manner as the distance D(0), but on the basis of alternative differences $\Delta f(x,n,p)$ corresponding to the level x is greater than the first threshold Dmin1.

If this first reference criterion is not satisfied by the alternative level x, then in a step S706, a Value of zero is given to the binary signal CRIT1(x) before Verifying in a step S707 whether the level x satisfies at least a second reference criterion that is less constricting. In the implementation shown, this second reference criterion is that the value of the distance D(x) is at least greater than a second threshold. Dmin2, which is less than the first threshold. Nevertheless, alternative criteria may also be envisaged for this second reference criterion. If this second reference criterion is still not satisfied by the alternative level x, then a value of zero is given to the binary signal CRIT2(x) and the method passes on to a step S709 in which it is verified whether the value of the counter x is already equal to the number X of alternative levels. If this is not yet so, then one unit is added to the counter x in a step S710 and the method loops back to the step S705. Alternatively, if the second reference criterion is indeed satisfied in the step S707, then in a step S711, the value 1 is assigned to the signal CIUT2(x) for the level x and one unit is added to the counter j. Thereafter, in a step S712, it is verified whether the counter k is still zero and whether the distance D(x) is greater than the value assigned to the parameter DMAX. If these two conditions are satisfied, then in a step S713, the value of the distance D(x) for the level x is assigned to this parameter DMAX prior to going to the step S709. Otherwise, the method goes directly to the step S709.

If the first reference criterion is indeed satisfied by the alternative level x in the step S705, then in a step S714 a value of 1 is assigned to the signal CRIT1(x) and one unit is added to the counter i. Thereafter, in a step S715, the value of the signal CRITX(x) is used to verify that a transition to the alternative level x is possible without frequencies crossing. If the value of the signal CRITX(x) is not zero, that means that the transition to the alternative level x involves at least one frequency crossing, and the method goes to the above-described step S712. Otherwise, if in step S715 it is verified that the value of the signal CRITX(x) is indeed zero, indicating that a transition to the alternative level x is indeed possible without frequencies crossing, it is verified in a step S716 whether the value of the counter k is still equal to zero or the distance D(x) is greater than the value of the comparative parameter DMAX. If at least one of these two conditions is satisfied, thus indicating that the alternative level x is either the first level to which a transition can be carried out without frequencies crossing, or the level presenting for the time being the distance D(x) that is the greatest from among those for which it has already been verified that the transition can be carried out without frequencies crossing, then in a step S717, the value of the distance D(x) is assigned of the parameter DMAX, prior to going to a step S718 in which one unit is added to the counter k, after which the method goes to the above-described step S709. In contrast, if none of the conditions verified in step S716 is satisfied, the method goes directly to the step S718 without going via the step S717.

Thus, at each loop between the step S705 and S709, if an alternative level x satisfies the condition CRITX(x)=0, whereby transition is possible without frequencies crossing, the value of the corresponding distance D(x) is assigned in the step S716 to the parameter DMAX if the first comparative criterion is satisfied and the value of the counter k is zero or the value of the distance D(x) is greater than the preceding value of the parameter DMAX, whereas if an alternative level x does not satisfy the condition CRITX(x)=0, then the value of the corresponding distance D(x) is not assigned to the parameter DMAX in the step S713 unless the first or at least the second reference criterion is satisfied, the value of the corresponding distance D(x) is greater than the preceding value of the parameter DMAX, and the counter k is still at zero, which means that no alternative parameter x has yet satisfied the condition CRITX(x)=0.

Consequently, at the end of this first portion of the algorithm, when the condition of the step S709 is finally satisfied and all of the X alternative levels have thus been taken into consideration, the value of the parameter DMAX corresponds either to the value of the greatest of the distances D(x) from among the set of alternative levels satisfying the first (and thus also the second) reference criterion and also satisfy the condition CRITX(x)=0, which levels are thus accessible without any frequencies being crossed, or else to the value of the greatest of the distance D(0) corresponding to the current level and of the distances D(x) from the set of alternative levels that satisfy at least one of the first and second reference criteria, if none of the alternative levels satisfies the first reference criterion and also the condition CRITX(x)=0.

The second portion of the algorithm performed by the step selection module F26 is shown in FIG. 8. If in the step S709 it is found that the last of the X alternative levels has already been reached, the state of the counter i is verified in steps S801 and S802. If in these steps S801 and S802 it is found that the Value of the counter i is respectively greater than zero or greater than 1, thus indicating that a plurality of alternative levels satisfy the first reference criterion, then the state of the counter k is verified in steps S803 and S804. If it is found in these steps S803 and S804 that the value of the counter k is respectively greater than zero or greater than 1, indicating that a plurality of alternative levels from among those satisfying the first reference criterion can be reached without frequency crossing, then in a step S805 it is verified whether the value of the distance D(x) is equal to the value of the parameter DMAX for more than one alternative level x for which the value of the signal CRITX(x) is zero. If so, then in a step S806, the step selection module F26 selects from among the plurality, of alternative levels x for which D(x)=DMAX and CRITX(x)=0, the level that has the highest rank in a predetermined order, and proceeds to order the transition to the selected level, after Which the algorithm is finalized in a step S807. In contrast, if in the step S805 it is found that the value of the distance D(x) is equal to the value assigned to the parameter DMAX for only one alternative level x from among those for which the value of signal CRITX(x) is zero, or if in the step S804 it is found that the value of the counter k is not greater than 1, that implies that only one alternative level x satisfies the condition CRITX(x)=0 and thus also D(x)=DMAX, and in a step S808, the module F26 proceeds to order the transition to the sole alternative level x that satisfies both conditions D(x)=DMAX and CRITX(x)=0, in order then to proceed with finalization in the step S807.

Furthermore, if in the step S802 it is found that the value of the counter i is not greater than one, which means that only one alternative level x satisfies the first reference criterion, then in a step S809, the module F26 proceeds to order the transition to the only alternative level x that satisfies this condition CRITX1(x)=1, before proceeding to finalization in the step S807.

The comparative parameter, i.e. the distance D(x) in the implementation shown, and the predetermined order of the alternative levels x can also be used to decide between a plurality of alternative levels x satisfying the first or second reference criterion when no level is accessible without a frequency crossing. Thus, if in the step S802 it is found that the value of the counter i is greater than one, that means that a plurality of alternative levels x satisfy the first reference criterion, but that in the step S803 it was found that the value of the counter k had remained at zero, indicating that none of those alternative levels x can be reached without frequency crossing, then the method goes to a step S810 in which it is verified whether there is more than one alternative level x presenting a distance D(x) equal to the distance assigned to the parameter DMAX. If so, then in a step S811, the module F26 proceeds to order the accumulator 8 to make a transition to the alternative level x with a distance D(x) equal to the value of the parameter DMAX and of highest rank prior to proceeding with finalization in the step S807. If not, then in a step S812, the module F26 proceeds to order the accumulator 8 to make a transition to the only alternative level x for which the value of the distance D(x) is thus equal to the value of the parameter DMAX, after which the method proceeds to finalization in the step S807. The step S810 is also reached if it is found in the step S801 that the value of the counter i has remained zero, which means that no alternative level x satisfies the first reference criterion, thereby leading to a first degraded mode of operation, and then in a following step S813 it is found that the value of the counter j is not zero, which means that at least one alternative level x satisfies the second reference criterion, and then it is found in a step S814 that the distance D(0) corresponding to the current level is less than the value of the parameter DMAX, corresponding to the greatest of the distances D(x) from among the alternative levels x.

However, if in the step S814 it is found that the distance D(0) corresponding to the current level is not less than the value of the parameter DMAX after the first portion of this algorithm, or if in the step S813 it is found that the value of the counter j has remained zero, such that no alternative level satisfies even the second reference criterion, and it is then found in a step S815 that the current level does indeed satisfy this second reference criterion, then the module F26 goes directly to finalization of the algorithm in the step S807 without ordering any level transition.

Finally, if in the step S815 it is found that the current level does not satisfy the second reference criterion either, then the module F26 is taken to a second degraded mode of operation in which, in a step S816, it orders rapidly alternating transitions between at least two different levels in an attempt to continue avoiding the pogo effect being triggered in spite of the hydraulic and mechanical resonant frequencies being close together.

Although the present invention is described with reference to a specific implementation, it is clear that various modifications and changes may be made to these implementations without going beyond the general ambit of the invention as defined by the claims. In addition, individual characteristics of the various implementations mentioned may be combined in additional implementations. Consequently, the description and the drawings should be considered in a sense that is illustrative rather than restrictive.

The invention claimed is:

1. A method of suppressing the pogo effect on a vehicle having at least one reaction engine and a feed system for feeding said engine with at least one liquid propellant, said feed system being fitted with a hydraulic accumulator capable of selecting between a plurality of predetermined operating levels, each corresponding to a different volume of gas in the hydraulic accumulator, the method comprising the following steps:
calculating that a set of current differences between each current hydraulic resonant frequency for each mode of a set of hydraulic resonance modes of said feed system with a current level of the accumulator from among the predetermined levels and a current mechanical resonant frequency for each mode of a set of mechanical resonance modes of a structure of said vehicle does not satisfy a first reference criterion;
calculating that a set of differences, for each level of a plurality of alternative levels, from among the plurality of predetermined operating levels, that are alternative to the current level, between each alternative hydraulic resonant frequency for each mode of the set of hydraulic resonance modes of said feed system and each current mechanical resonant frequency satisfied said first reference criterion;
selecting a target alternative level, from among said plurality of alternative levels, for which no hydraulic resonant frequency crosses any current mechanical resonant frequency during a transition from the current level; and
changing the volume of gas in the hydraulic accumulator so as to transition from the current level to the target alternative level without any hydraulic resonant frequency crossing any current mechanical resonant frequency.

2. The method of suppressing the pogo effect according to claim 1, wherein, the hydraulic accumulator can pass from the current level to any of multiple alternative levels, from among said plurality of levels for which the first reference criterion is satisfied, without any hydraulic resonant frequency crossing any current mechanical resonant frequency during the transition, and the target alternative level is an alternative level, from among said multiple alliterative levels, for which a comparative parameter, calculated as a function of the corresponding set of differences, presents a maximum value.

3. The method of suppressing the pogo effect according to claim 2, wherein several alternative levels from among said multiple alternative levels for which the first reference criterion is satisfied and to which the transition would not involve any frequency crossing present the same maximum value for said comparative parameter, and the target alliterative level is an alternative level having a maximum rank in a predetermined order, from among said several alternative levels.

4. The method of suppressing the pogo effect according to claim 1, wherein, the first reference criterion is not satisfied by all of the current differences but is satisfied by each difference for a single alternative level, and the target alternative level is the single alternative level that completely satisfies the first reference criterion.

5. The method of suppressing the pogo effect according to claim 1, wherein said first reference criterion is that each difference is greater than a predetermined threshold.

6. The method of suppressing the pogo effect according to claim 1, wherein it is determined that no hydraulic resonant frequency will cross any current mechanical resonant frequency during the transition of the hydraulic accumulator from the current level to the target alternative level, by performing the following steps:
   determining, for each mode of said set of hydraulic resonance modes, a minimum hydraulic resonant frequency and a maximum hydraulic resonant frequency from the hydraulic resonant frequency for the current level and from the hydraulic resonant frequency for the target alternative level; and
   comparing, for each mode of said set of hydraulic resonance modes, the minimum hydraulic resonant frequency and the maximum hydraulic resonant frequency with the current mechanical resonant frequency for each mechanical resonance mode of said set of mechanical resonance modes, it not being possible for any hydraulic resonant frequency to cross any current mechanical resonant frequency during the transition to the target alternative level when, for none of said hydraulic and mechanical resonance modes, the minimum hydraulic resonant frequency is less than the mechanical resonant frequency and the maximum hydraulic resonant frequency is greater than the mechanical resonant frequency.

7. A vehicle comprising at least:
   a reaction engine; and
   a feed system for feeding said engine with at least one liquid propellant, said feed system being provided with a hydraulic accumulator enabling a selection to be made between a plurality of predetermined operating levels each corresponding to a different volume of gas in the hydraulic accumulator, and a control unit configured to:
   calculate a set of current differences between each current hydraulic resonant frequency for each mode of a set of hydraulic resonance modes of said feed system with a current level of the accumulator from among the predetermined levels and a current mechanical resonant frequency for each mode of a set of mechanical resonance modes of a structure of said vehicle does not satisfy a first reference criterion;
   calculate a set of differences, for each level of a plurality of alternative levels, from among the plurality of predetermined operating levels, that are alternative to the current level, between each alternative hydraulic resonant frequency for each mode of the set of hydraulic resonance modes of said feed system and each current mechanical resonant frequency satisfies said first reference criterion;
   select a target alternative level, from among said plurality of alternative levels for which no hydraulic resonant frequency crosses any current mechanical resonant frequency during a transition from the current level; and
   change the volume of gas in the hydraulic accumulator so as to transition from the current level to the target alternative level without any hydraulic resonant frequency crossing any current mechanical resonant frequency.

* * * * *